May 9, 1961     J. Y. RESNICK     2,983,306
APPARATUS FOR CONTINUOUSLY SEALING THERMOPLASTIC MATERIALS
Filed Feb. 27, 1959
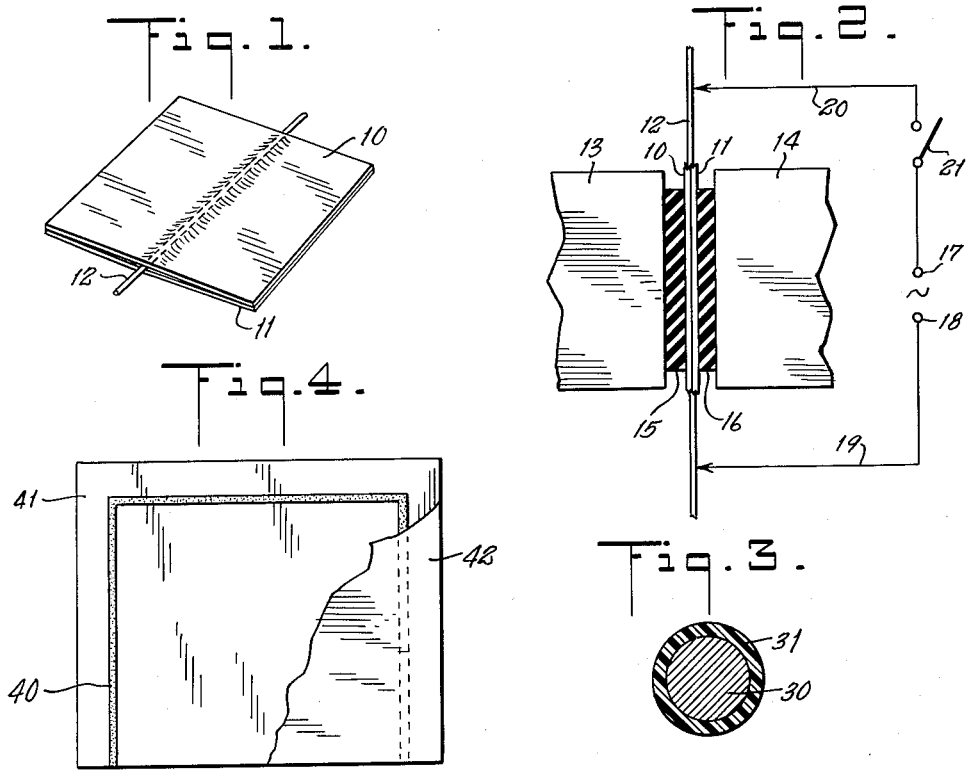
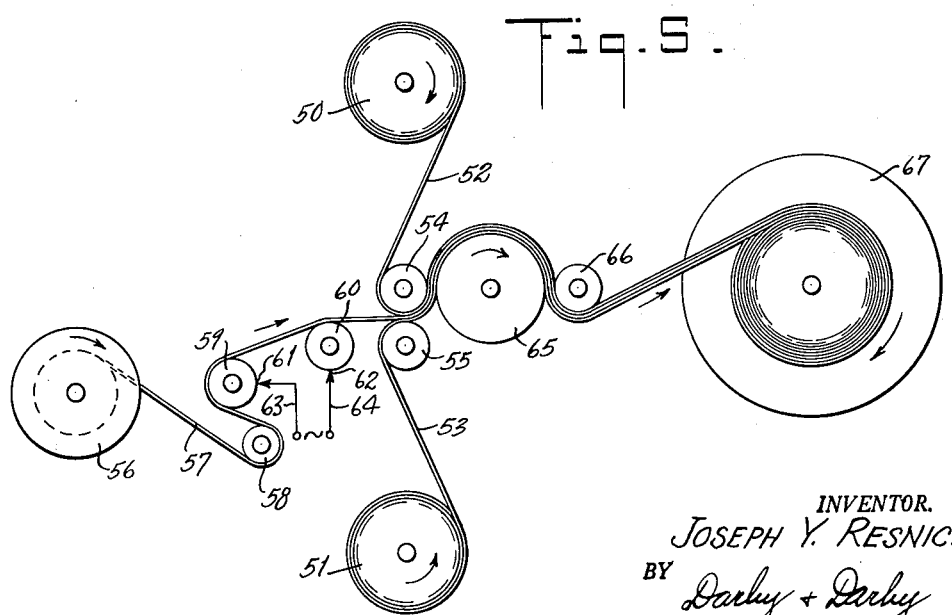
INVENTOR.
JOSEPH Y. RESNICK
BY Darby + Darby
ATTORNEYS United States Patent Office 2,983,306
Patented May 9, 1961

2,983,306
APPARATUS FOR CONTINUOUSLY SEALING THERMOPLASTIC MATERIALS
Joseph Y. Resnick, 32 Elm St., Ellenville, N.Y.
Filed Feb. 27, 1959, Ser. No. 796,066
6 Claims. (Cl. 154—42)

This invention relates to the sealing of sheets of thermoplastic material and more particularly to a method and apparatus which are especially suited for the sealing of relatively thick sheets of such material.

Thermoplastic materials possess the characteristic of being rendered soft or pliable upon the application of heat. If the heat applied is above the fusing temperature for the material, the material melts or fuses. Subsequently, when the material cools, it hardens to its original state. Accordingly, when it is desired to seal two or more sheets of thermoplastic material together, the sheets are heated until they fuse together, thus forming the required seal at the points of fusion. A common method of sealing involves the application of one or more heated members to the outer surfaces of the sheets to be sealed. When the heated member is pressed against the outer surfaces of the sheets, the heat fuses the sheets together and forms the seal. By suitably shaping the heating member or members, the seal may be caused to have any desired shape. It has been found, however, that this method of sealing is unsuited for sheets of thermoplastic material which are relatively thick. Since the heat required to effect the seal must obviously be transmitted through the thickness of at least one of the sheets, a high heating temperature is usually required on the outer surface of the sheet. This, of course, may cause the outer surfaces of the sheets to burn or mar, thus rendering them not usable for many applications. Furthermore, some thermoplastic materials have such a high fusing temperature, as compared to their burning temperature, that the external heat necessary to produce sealing of even thin sheets is raised to a prohibitive value.

Accordingly, it is an object of this invention to provide a method and apparatus for sealing sheets of thermoplastic material of substantial thickness.

It is a further object of this invention to provide a method and apparatus for sealing sheets of thermoplastic material, which method and apparatus greatly simplify the formation of seals having complex physical configurations.

It is a still further object of this invention to provide apparatus for continuously sealing long sheets of thermoplastic material, which apparatus is especially suited for use with substantially thick sheets of such material.

Briefly, the invention contemplates the sealing of sheets of thermoplastic material through the use of at least one electrically conductive heating element provided between the sheets and the application of pressure to the sheets to effect the seal. Since the heating element is operable to fuse the material of the sheets together when it is suitably energized, the heat required to seal the sheets is confined to the inner surfaces of the sheets. This arrangement requires only the minimum amount of heat necessary to fuse the thermoplastic material to be used and thus does not adversely affect the remaining portions of the sheets. The heating element may take any convenient form, such as a conventional wire of circular cross-section or a thin, flat strip of electrically conductive material, for example. Since the heating element itself may be formed of a flexible material, such as copper, it is possible to produce seals having any desired shape or physical configuration, without the necessity of resorting to expensive, specially-shaped, external heating members. If desired, the heating element may be premounted on one or more sheets of the material to be sealed by printing a thin layer of electrically conductive material on the sheet, or by stitching a wire through the sheet. Additionally, the heating element itself may be coated with a thermoplastic material so that greater strength is obtained for the seal.

The invention also contemplates apparatus for continuously sealing long sheets of thermoplastic material. Such apparatus may comprise a pair of pressure rollers and means for simultaneously, continuously feeding at least two sheets of thermoplastic material to the input side of the rollers. Means are also provided for feeding at least one elongated, electrically conductive heating element to the input side of the pressure rollers between the sheets of material, so that the heating element is "sandwiched" between the sheets. A pair of electrical contact elements are located on the input side of the pressure rollers in contact with the heating element at spaced points along the length thereof, and electric circuit means are included to energize the contacts to pass a heating current through the heating element between the spaced points. Thus, the heating element is heated to a suitable temperature before being sandwiched between the thermoplastic sheets in the pressure rollers. By this means, the sheets are sealed together in the pressure rollers in a continuous operation.

In the drawing:

Fig. 1 shows two sheets of thermoplastic material having a heating element inserted between them prior to the sealing operation;

Fig. 2 is a schematic diagram of apparatus for sealing the sheets of Fig. 1;

Fig. 3 is a cross-sectional view of a heating element having a coating of the thermoplastic material formed thereon;

Fig. 4 shows two sheets of thermoplastic material having a heating element premounted on one sheet by a printed circuit technique, one of the sheets being broken away for clarity of illustration; and Fig. 5 is a schematic diagram of apparatus for continuously sealing long sheets of thermoplastic material.

Referring now to Fig. 1 of the drawing, there is shown thermoplastic sheets 10 and 11 having a heating element 12 inserted therebetween. The sheets 10 and 11 may be of any material having the required thermoplastic characteristic, such as vinyl, polyethylene, polyester and the like, while the heating element 12 may be formed of any electrically conductive material such as copper, steel and the like, for example,. In Fig. 2 of the drawing, the thermoplastic sheets 10 and 11 are shown in a sealing arrangement including pressure applying members 13 and 14. The inner surfaces of the members 13 and 14 may comprise sections 15 and 16 which are formed of any conventional heat insulating material to reduce the heat loss from the operation. In practice, the members 13 and 14 may be the jaws of a vise or may be parts of a more complicated pressure applying arrangement. The heating element 12 is connected across the terminals 17 and 18 of a source (not shown) of electrical energy by means of leads 19 and 20 and a switch 21. The leads 19 and 20 may be clamped to the ends of the heating element 12 by any conventional electrical connector or may simply be held in contact with the element by a suitable jig or other fixture. Since the function of the source of electrical energy is to pass a heating current through the element 12, it is immaterial whether an alternating current source or a direct current source is employed.

The operation of the above-described arrangement is as follows. The members 13 and 14 are applied to the sheets 10 and 11 with a force sufficient to ensure good contact between the sheets and the switch 21 is closed to energize the heating element 12. The heating element then raises the temperature of the inner surfaces of the sheets adjacent the element until the fusing point of the material is reached, at which time, the sheets fuse together to form the seal. The switch 21 is then opened and the sheets allowed to cool to harden the fused material. Since the fusing temperatures of the various thermoplastic materials are different, the resistivity of the heating element, the magnitude and duration of the current applied and the pressure applied to the sheets must be determined for each material. As an example, two sheets of 10 mil polyethylene plastic were sealed together utilizing a 7-stranded ordinary steel wire having an overall diameter of about .035" and a length of 16" as the heating element. A voltage of 9.6 volts A.C. was applied to the ends of the wire for 3 seconds. During this test, the current fell from an initial value of 50 amperes to 25 amperes because of the increase in resistance of the wire with temperature. The plastic sheets were pressed together with a force of about 2.5 pounds per square inch and the pressure was maintained for approximately 2 seconds after the heating element was deenergized to permit adequate cooling. With the foregoing test parameters, a satisfactory seal was obtained along the length of the wire. It will be understood, however, that these test values are in no way critical since adequate sealing could be obtained by using other, different, values.

In many instances, it is desirable to obtain a more uniform and somewhat stronger seal than may be obtained with the method and apparatus as thus far described. When the heating element is a wire of substantial thickness, as compared to the thermoplastic sheets, the melting of the sheets adjacent the wire may cause a thinning of the sheets along the line of the seal. This may be avoided by utilizing a precoated heating element as shown in Fig. 3 of the drawing. Here, the heating element is in the form of a wire 30 of circular cross-section and is covered with a coating 31 of thermoplastic material. The coating 31 may be formed of the same thermoplastic material as the sheets to be sealed or may be formed of a different material. When the heating element is energized, the coating 31 will fuse with the material of the sheets, thus adding additional material to maintain the overall thickness of the combined sheets along the line of the seal.

Fig. 4 of the drawing shows an alternative arrangement for the heating element. In this arrangement, a strip 40 of electrically conductive material is deposited by any convenient means, such as printing, for example, upon the inner surface of a thermoplastic sheet 41. A sheet 42 of thermoplastic material (shown partially broken away) is placed on top of the sheet 41 and may be sealed to it by the energization of the heating element 40. Since the heating element in this case is premounted on one sheet, this technique readily lends itself to continuous sealing operations and furthermore, permits the seal to be made in a variety of patterns. For example, the strip 40 could be curved to follow a particular design, thus enhancing the ornamental appearance of the sheets. It will be understood of course that any form of heating element may be utilized and may be premounted on one or both of the sheets by any desired means. For example, the heating element could be grommet formed of electrically conductive material or could take the form of a wire stitched to one of the sheets by an industrial type sewing machine.

Fig. 5 of the drawing illustrates apparatus constructed in accordance with the teachings of the invention for continuously sealing long sheets of thermoplastic material. As seen therein, a pair of supply rolls 50, 51 are arranged to continuously feed sheets 52, 53 of the thermoplastic material to the input side of a pair of pressure rollers 54, 55. The pressure rollers 54 and 55 are suitably spaced to accommodate sheets 52, 53 and to apply a suitable pressure to the sheets when they are drawn through the rollers. If desired, the pressure rollers 54, 55 may be covered with a heat insulating material, such as Teflon, for example, to reduce the heat loss during the actual sealing operation. A supply roll 56 is arranged to supply an elongated heating element 57 to the input side of the pressure rollers between the sheets 52, 53. An idle guide pulley 58 may be employed to guide the heating element 57 to a pair of idle pulleys 59, 60. The pulleys 59 and 60 are formed of an electrically conductive material, such as copper, for example, so that the portion of the heating element between their points of contact may be energized. The pulleys 59 and 60 themselves are energized by brushes, shown schematically as 61 and 62, which are connected by leads 63 and 64 to a suitable (not shown) of electrical energy. By this arrangement, the heating element 57 is heated by the passage of an electric current through it as it passes over the copper pulleys. Thus, as the heated wire leaves the pulleys, it enters the pressure rollers 54, 55 and is squeezed between the sheets 52 and 53 to produce a continuous seal.

The sealed sheets appearing at the output side of the pressure rollers are then passed over an additional pressure roller 65 which maintains these sheets under pressure until the seal has time to cool. An idle roller 66 serves to guide the sealed sheets from the pressure roller 65 to a power-driven take-up roll 67. While the takeup roll 67 in the arrangement as described is power-driven, and serves to pull the sheets of thermoplastic material and the heating element through the pressure rollers, it is believed obvious that the pressure rollers themselves could be power-driven if it is desired to supply the sealed sheets directly to another processing machine. Furthermore, it will be understood that the heating element 57 may take any desired form and may even be premounted on one of the sheets 52, 53.

It is believed apparent that many changes could be made in the above-described method and apparatus and many seemingly different embodiments of the invention constructed without departing from the scope thereof. For example, the heating element could take any desired form or shape and the material to be sealed need not necessarily be in sheet form. Furthermore, when a coated heating element is used as shown in Fig. 3, of the drawing, the sheets to be sealed need not necessarily be themselves formed of thermoplastic material, since the thermoplastic coating on the heating element may act as an adhesive to bind the sheets. Accordingly, it is intended that all matter contained in the above description or shown in the accompanying drawing shall be interpreted as illustrative and not in a limiting sense.

What is claimed is:

1. Apparatus for continuously sealing long sheets of thermoplastic material comprising a pair of rotatable pressure rollers; means for simultaneously continuously feeding at least two sheets of thermoplastic material to the input side of said pressure rollers; means for continuously feeding at least one elongated electrically conductive heating element to the input side of said pressure rollers between said sheets; and means located on the input side of said pressure rollers for causing an electric current to flow through at least a portion of said heating element, whereby said heating element heats the sheets in the pressure rollers to thereby form a continuous seal.

2. Apparatus as claimed in claim 1, wherein said last-named means comprises a pair of electrical contact elements in contact with said heating element at spaced points along the length thereof, and electric circuit means for energizing said contact elements, so that said electric current flows through said heating element between said spaced points.

3. Apparatus as claimed in claim 2, wherein said electrical contact elements are guide pulleys formed of electrically conductive material, and said electric circuit means includes a pair of brushes in contact with said pulleys.

4. Apparatus for continuously sealing long sheets of thermoplastic material comprising a pair of rotatable pressure rollers; a pair of rotatable supply rolls for simultaneously continuously feeding two sheets of thermoplastic material to the input side of said pressure rollers; at least one rotatable supply roll for continuously feeding an elongated electrically conductive heating element to the input side of said pressure rollers between said sheets; a power driven take-up roll located on the output side of said pressure rollers for pulling said sheets and said heating element through the pressure rollers; a pair of electrical contact elements located on the input side of said pressure rollers, said contact elements being in contact with said heating element at spaced points along the length thereof; and electric circuit means for energizing said contact elements, so that an electric current flows through said heating element between said spaced points, whereby said heating element heats the sheets in the pressure rollers to thereby form a continuous seal.

5. Apparatus as claimed in claim 4, wherein an additional pressure roller is located on the output side of said first-named pressure rollers to maintain the sealed sheets under pressure while the seal cools.

6. Apparatus as claimed in claim 5, wherein the outer surfaces of said first-named pressure rollers are formed of a heat insulating material.

References Cited in the file of this patent
UNITED STATES PATENTS

| | | |
|---|---|---|
| 2,453,313 | Gordon | Nov. 9, 1948 |
| 2,640,796 | Langer | June 2, 1953 |
| 2,647,072 | Smith | July 28, 1953 |
| 2,711,781 | Langer | June 28, 1955 |
| 2,713,017 | Bruns | July 12, 1955 |